(12) United States Patent
Greenlee (10) Patent No.: US 9,138,727 B2
(45) Date of Patent: Sep. 22, 2015

(54) IRON—NICKEL CORE-SHELL NANOPARTICLES

(71) Applicant: National Institute of Standards and Technology, Gaithersburg, MD (US)

(72) Inventor: Lauren F. Greenlee, Boulder, CO (US)

(73) Assignee: THE UNITED STATES OF AMERICA, AS REPRESENTED BY THE SECRETARY OF COMMERCE, THE NATIONAL INSTITUTE OF STANDARDS AND TECHNOLOGY, Washington, DC (US)

( * ) Notice: Subject to any disclaimer, the term of this patent is extended or adjusted under 35 U.S.C. 154(b) by 120 days.

(21) Appl. No.: 13/958,770

(22) Filed: Aug. 5, 2013

(65) Prior Publication Data

US 2014/0162868 A1    Jun. 12, 2014

Related U.S. Application Data

(60) Provisional application No. 61/736,065, filed on Dec. 12, 2012.

(51) Int. Cl.
| | |
|---|---|
| B01J 23/745 | (2006.01) |
| B01J 23/755 | (2006.01) |
| B01J 35/00 | (2006.01) |
| B01J 35/08 | (2006.01) |
| B01J 37/16 | (2006.01) |
| H01M 4/90 | (2006.01) |

(52) U.S. Cl.
CPC ............ *B01J 23/755* (2013.01); *H01M 4/9041* (2013.01); *B01J 35/008* (2013.01); *B01J 35/0013* (2013.01); *B01J 35/0033* (2013.01); *B01J 37/16* (2013.01); *Y02E 60/50* (2013.01)

(58) Field of Classification Search
CPC ........ B01J 23/745; B01J 23/755; B01J 35/00; B01J 35/08; B01J 35/0086; B01J 37/0072; B01J 37/16
USPC .................................. 502/337, 338; 428/403
See application file for complete search history.

(56) References Cited

U.S. PATENT DOCUMENTS

| | | | |
|---|---|---|---|
| 3,770,500 A * | 11/1973 | Imaoka et al. ................. | 428/403 |
| 8,361,924 B2 | 1/2013 | Tanaka et al. | |
| 8,383,014 B2 | 2/2013 | Vanheusden et al. | |
| 2006/0070491 A1 | 4/2006 | Yang et al. | |
| 2008/0220231 A1* | 9/2008 | Suetsuna et al. .............. | 428/216 |
| 2010/0019204 A1 | 1/2010 | Haase | |
| 2010/0060539 A1* | 3/2010 | Suetsuna et al. .............. | 343/787 |
| 2010/0215851 A1 | 8/2010 | Shoji et al. | |
| 2010/0234211 A1 | 9/2010 | Hsueh et al. | |

(Continued)

OTHER PUBLICATIONS

"ATMP-abilized iron nanoparticles: chelator-controlled nanoparticle synthesis," Lauren F. Greenlee et al. J. Nanopart. Res. (2014), 16:2712, pp. 1-16.*

(Continued)

*Primary Examiner* — Patricia L Hailey
(74) *Attorney, Agent, or Firm* — Mark E. Bandy; Rankin, Hill & Clark LLP (57) ABSTRACT

Core-shell nanoparticles and techniques for their synthesis are described herein. Generally, the nanoparticles comprise a core that includes iron and at least one shell disposed about the core that includes nickel. In certain versions, the nanoparticles are free of precious metals.

25 Claims, 9 Drawing Sheets

(56) References Cited

U.S. PATENT DOCUMENTS

| | | | |
|---|---|---|---|
| 2011/0143913 A1 | 6/2011 | Yang et al. | |
| 2012/0000795 A1* | 1/2012 | Ramaprabhu et al. | 205/792 |
| 2012/0135862 A1 | 5/2012 | Hwang et al. | |
| 2012/0316054 A1 | 12/2012 | Lopez et al. | |
| 2013/0078510 A1 | 3/2013 | Reynolds et al. | |
| 2014/0225024 A1* | 8/2014 | Kim et al. | 252/62.55 |

OTHER PUBLICATIONS

"One-step synthesis of Cu@FeNi core-shell nanoparticles: Highly active catalyst for hydrolytic dehydrogenation of ammonia borane," Hong-Li Wang et al. International Journal of Hydrogen Energy 37 (2012), pp. 10229-10235.*

"Nanoscale iron particles for environmental remediation: An overview," Wei-xian Zhang et al. Journal of Nanoparticle Research 5: 323-332, 2003, pp. 323-332.*

"Characterization of oxidation resistant Fe@M (M=Cr, Ni) core@shell nanoparticles prepared by a modified reverse micelle reaction," Sweta H. Naik et al. Journal of Applied Physics 109, 07B519 (2011), pp. 1-3.*

"Iron Nanoparticles: the Core-Shell Structure and Unique Properties for Ni(II) Sequestration," Xiao-qin Li et al. Langmuir 2006, 22, pp. 4638-4642.*

Ferrel, J.R.; Sachdeva, S.; Strobel, T.A.; Gopalakrishan, G.; Koh, C.A.; Pez, G.; Cooper, A.C.; Herring, A.M.; Exploring the Fuel Limits of Direct Oxidation Proton Exchange Membrane Fuel Cells with Platinum Based Electrocatalysts; Journal of the Electrochemical Society 2012, 159, B371, U.S.

Maiyalagan, T.; Scott, K.; Performance of carbon nanofiber supported Pd—Ni catalysts for electro-oxidation of ethanol in alkaline medium; Journal of Power Sources 2010, 195, 5246, UK.

Yu, E.H.; Scott, K.; Reeve, R.W.; A study of the anodic oxidation of methanol on Pt in alkaline solutions; Journal of Electroanalytical Chemistry, 2003, 130, p. 17-24, U.K.

Alayoglu, S.; Eichhorn, B.; Rh—Pt Bimetallic Catalysts: Synthesis, Characterization, and Catalysis of Core-Shell, Alloy, and Monometallic Nanoparticles; Journal of the American Chemical Society 2008, 130, 17479, U.S.

Arico, A.S.; Bruce, P.; Scrosati, B.; Tarascon; J.M.; Van Schalkwijk, W.; Nanostructured materials for advanced energy conversion and storage devices; Nature Materials 2005, 4, 366, IT, FR, UK, U.S.

Chen, W.F.; Sasaki, K.; MA, C.; Frenkel, A.I.; Marinkovic, N; Muckerman, J.T.; Zhu, Y.; Adzic, R.; Hydrogen-Evolution Catalysts Based on Non-Noble Metal Nickel—Molybdenum Nitride Nanosheets; Angew. Chem., 2012, 51, 6131, U.S.

Barazzouk, S.; Lefevre, M.; Dodelet, J.P.; Oxygen Reduction in PEM Fuel Cells: Fe-Based Electrocatalysts Made with High Surface Area Activated Carbon Supports; Journal of the Electrochemical Society 2009, 156, B1466, CA.

Hyman, M.P.; Medlin, J.W.; Effects of Electronic Structure Modifications on the Adsorption of Oxygen Reduction Reaction Intermediates on Model Pt(111)-Alloy Surfaces; J. Phys. Chem. C 2007, 111, 17052, U.S.

Sasaki, K.; Zhang, J.L.; Wanh, J.; Uribe, F.; Adzic, R.; Platinum submonolayer-monolayer electrocatalysts: an electrochemical and X-ray absorption spectroscopy study; Research on Chemical Intermediates 2006, 32, 543, U.S.

Lee, S.W.; Chen, S.; Sheng, W.; Yabuuchi, N.; Kim, Y.T.; Mitani, T.; Vescovo, E.; Shao-Horn, Y.J.; Roles of Surface Steps on Pt Nanoparticles in Electro-oxidation of Carbon Monoxide and Methanol; Am. Chem. Soc. 2009, 131, 15669, JP, U.S.

Gong, K.P.; Su, D.; Adzic, R.R.; Platinum-Monolayer Shell on AuNi0.5Fe Nanoparticle Core Electrocatalyst with High Activity and Stability for the Oxygen Reduction Reaction; J. Am. Chem. Soc. 2010, 132,14364, U.S.

Ghosh, T.; Vukmirovic, M.B.; Disalvo, F.J.; Adzic, R.R.; Intermetallics as Novel Supports for Pt Monolayer O2 Reduction Electrocatalysts: Potential for Significantly Improving Properties; Journal of the American Chemical Society 2010, 132, 906, U.S.

Zhang, M.; Yan, Z.; Xie, J. ; Core/shell Ni@Pd nanoparticles supported on MWCNTs at improved electrocatalytic performance for alcohol oxidation in alkaline media; Electrochimica Acta 2012, p. 1-7, CN.

Nilekar, A.U.; Xu, Y.; Zhang, J.L.; Vukmirovic, M.B.; Sasaki, K.; Adzic, R.R.; Mavrikakis, M.; Bimetallic and Ternary Alloys for Improved Oxygen Reduction Catalysis; Top. Catal. 2007, 46, 276, U.S.

Kitchin, J.R.; Norskov, J.K.; Barteau, M.A.; Chen, J.G.; Modification of the surface electronic and chemical properties of Pt (111) by subsurface 3d transition metals; Journal of Chemical Physics 2004, 120, 10240, U.S.

Nilekar, A.U; Alayoglu, S.; Eichhorn, B.; Mavrikakis, M.; Preferential CO Oxidation in Hydrogen: Reactivity of Core-Shell Nanoparticles; Journal of the American Chemical Society 2010, 132, 7418, U.S.

Alayoglu, S.; Zavalij, P.; Eichhorn, B.; Wang, Q.; Frenkel, A.I.; Chupas, P.; Structural and Architectural Evaluation of Bimetallic Nanoparticles: A Case Study of Pt—Ru Core-Shell and Alloy Nanoparticles; ACS Nano 2009, 3, 3127, U.S.

Kim, S.; Kim, C.; Lee, H.; Shape- and Composition-Controlled Pt—Fe—Co Nanoparticles for Electrocatalytic Methanol Oxidation; Top. Catal. 2010, 53, 686, KR.

Yang, X.; Yang, Q.; Xu, J.; Lee, C.S.; Bimetallic PtPd nanoparticles on Nafion-graphene film as catalyst for ethanol electro-oxidation; J. Matter. Chem. 2012, 22, 8057, CN.

Hassan, H.B.; Electro-Oxidation of Ethanol and Propanol at Pt and Ti Modified Nanoparticle Substrates for Direct Alcohol Fuel Cells (DAFCs); The Open Electrochemistry Journal 2009, 1, 19, EG.

Li, Z.; Gao, J.; Xing, X.; Wu, S.; Shuang, S.; Dong, C.; Paau, M.C.; Choi, M.M.F.; Synthesis and Characterization of n-Alkylamine-Stabilized Palladium Nanoparticles for Electrochemical Oxidation of Methane; J. Phys. Chem. C 2010, 114, 723, CN.

Li, H.; Wang, R.; Hong, Q.; Chen, L.; Zhong, Z.; Koltypin, Y.; Calderon-Moreno, J.; Gedanken, A.; Ultrasound-Assisted Polyol Method for the Preparation of SBA-15-Supported Ruthenium Nanoparticles and the Study of Their Catalytic Activity on the Partial Oxidation of Methane; Langmuir 2004, 20, 8352, JP.

Villullas, H.M.; Mattos-Costa, F.I.; Bulhoes, L.O.S.; Electrochemical Oxidation of Methanol on Pt Nanoparticles Dispersed on RuO2; J. Phys. Chem. B 2004, 108, 12898, BR.

Gloaguen, F.; Leger, J.M.; Lamy, C.; Electrocatalytic oxidation of methanol on platinum nanoparticles electrodeposited onto porous carbon substrates; Journal of Applied Electrochemistry 1997, 27, 1052; FR.

Macak, J.M.; Barczuk, P.J.; Tsuchiya, H.; Nowakowska, M.; Ghicov, A.; Chojak, M.; Bauer, S.; Virtanen, S.; Kulesza, P.J.; Schmuki, P.; Self-organized nanotubular TiO2 matrix as support for dispersed Pt/Ru nanoparticles: Enhancement of the electrocatalytic oxidation of methanol; Electrochemistry Communications 2005, 7, 1417.

Jiang, Q.; Jiang, L.; Wang, S.; Qi, J.; Sun, G.; A highly active PtNi/C electrocatalyst for methanol electro-oxidation in alkaline media; Catalysis Communications 2010, 12, 67, CN.

Jin, C.; Sun, X.; Chen, Z.; Dong, R.; Electrocatalytic activity of PdNi/C catalysts for allyl alcohol oxidation in alkaline solution; Materials Chemistry and Physics 2012, p. 1-5, CN.

Yi, Y.; Uhm, S.; Lee, J.; Electrocatalytic Oxidation of Ethanol on Nanoporous Ni Electrode in Alkaline Media; Electrocatalysis 2010, 1, 104, KR.

Goldstein, N.; Greenlee, L.F.; Influence of synthesis parameters on iron nanoparticle size and zeta potential; Journal of Nanoparticle Research 2012, 14, 760, U.S.

Carroll, K.J.; Hudgins, D.M.; Spurgeon, S.; Kemner, K.M.; Mishra, B.; Boyanov, M. I.; Brown, L.W.; Taheri, M.L.; Carpenter, E.E.; One-Pot Aqueous Synthesis of Fe and Ag Core/Shell Nanoparticles; Chem. Mat. 2010, 22, 6291, U.S.

Zheng, Z.H.; Yuan, S.H.; Liu, Y.; Lu, X.H.; Wan, J.Z.; Wu, X.H.; Chen, J.; Reductive dechlorination of hexachlorobenzene by Cu/Fe bimetal in the presence of nonionic surfactant; Journal of Hazardous Materials 2009, 170, 895, CN.

Bransfield, S.J.; Cwiertny, D.M.; Livi, K.; Fairbrother, D.H.; Influence of transition metal additives and temperature on the rate of

(56) References Cited

OTHER PUBLICATIONS organohalide reduction by granular iron: Implications for reaction mechanisms; Applied Catalysis B-Environmental 2007, 76, 348, U.S.

Lee, C.; Sedlak, D.L.; Enhanced Formation of Oxidants from Bimetallic Nickel#Iron Nanoparticles in the Presence of Oxygen; Environmental Science & Technology 2008, 42, 8528, U.S.

He, F.; Zhao, D.Y.; Liu, J.C.; Roberts, C.B.; Stabilization of Fe—Pd Nanoparticles with Sodium Carboxymethyl Cellulose for Enhanced Transport and Dechlorination of Trichloroethylene in Soil and Groundwater; Industrial & Engineering Chemistry Research 2007, 46, 29, U.S.

He, F.; Zhao, D.Y.; Preparation and Characterization of a New Class of Starch-Stabilized Bimetallic Nanoparticles for Degradation of Chlorinated Hydrocarbons in Water; Environmental Science & Technology 2005, 39, 3314, U.S.

Fung, K.K.; Qin, B.X.; Zhang, X.X.; Passivation of a-Fe nanoparticle by epitaxial g-Fe2O3 shell; Materials Science and Engineering A—Structural Materials 2000, 286, 135, CN, HK.

Linderoth, S.; Morup, S.; Bentzon, M.D.; Oxidation of nanometer-sized iron particles; J. Mater. Sci. 1995, 30, 3142, DK.

Chernavskii, P.A.; Peskov, N.V.; Mugtasimov, A.V.; Lunin, V.V.; Oxidation of metal nanoparticles; Russian Journal of Physical Chemistry B, 2007, 1, 394, RU.

Mattern, N.; Moldenhauer, S.; Danzig, A.; Blau, W.; Richter, K.; Mueller, M.; X-Ray Diffraction Study of the Crystallization of Amorphous Fe—B—Si—Cu—Nb Alloys; Phys. Stat. Sol., 1993, 138, 59, DE.

Patterson, A.L.; the Schemer formula for x-ray particle size determination; Physical Review 1939, 56, 978, U.S.

Makinson, J.D.; Lee, J.S.; Magner, S.H.; De Angelis, R.J.; Weins, W.N.; Hieronymus, A.S.; X-ray diffraction signatures of defects in nanocrystalline materials; Advances in X-ray Analysis 2000, 254, 2441, U.S.

Yamashita, T.; Hayes, P.; Analysis of XPS spectra of $Fe^{2+}$ and $Fe^{3+}$ ions in oxide materials; Appl. Surf. Sci., 2008, 254, 2441, AU.

Descostes, M.; Mercier, F.; Thromat, N.; Beaucaire, C.; Gautier-Soyer, M.; Use of XPS in the determination of chemical environment and oxidation state of iron and sulfur samples: constitution of a data basis in binding energies for Fe and S reference compounds and applications to the evidence of surface species of an oxidized pyrite in a carbonate medium; Appl. Surf. Sci. 2000, 165, 288, FR.

Grosvenor, A.P.; Biesinger, M.C.; Smart, R.S.C.; McIntyre, N.S.; New interpretations of XPS spectra of nickel metal and oxides; Surface Science 2006, 600, 1771, AU.

Nesbitt, H.W.; Legrand, D.; Bancroft, G.M.; Interpretation of Ni2p XPS spectra of Ni conductors and Ni insulators; Phys. Chem. Minerals, 2000, 27, 357, CA.

Lv, X.; Xu, Z.; Yan, Z.; Li, X.; Bimetallic Nickel—Iron-Supported Pd Electrocatalyst for Ethanol Electrooxidation in Alkaline Solution; Electrocatalysis, 2011, 2, 82; CN.

Risbud, M.S.; Baxter, S.; Skyllas-Kazacos, M.; Preparation of Nickel Modified Carbon Fibre Electrodes and their Application for Methanol Oxidation; The Open Fuels & Energy Science Journal, 2012, 5, 9, AU.

\* cited by examiner

| DESCRIPTION | REGION OF PARTICLE | Fe (ATOMIC %) | Ni (ATOMIC %) | O (ATOMIC %) |
|---|---|---|---|---|
| DARK CENTER |  | 40.3 | 28.7 | 30.9 |
| LIGHT CENTER |  | 36.2 | 43.8 | 19.9 |
| DARK RING |  | 37.4 | 32.8 | 29.8 |
| DARK RING | | 32.6 | 39.0 | 28.4 |
| OUTER SHELL |  | 72.0 | 28.0 | 0.0 |
| NO SHELL |  | 33.8 | 13.7 | 52.5 |
| SOLID PARTICLE |  | 62.9 | 8.2 | 28.8 |

IRON—NICKEL CORE-SHELL NANOPARTICLES

CROSS REFERENCES TO RELATED APPLICATIONS

This application claims priority from U.S. provisional application Ser. No. 61/736,065 filed on Dec. 12, 2012.

FIELD

The present subject matter relates to nanoparticles and in particular, core-shell nanoparticles. The present subject matter also relates to methods for producing core-shell nanoparticles.

BACKGROUND

Monometallic and bimetallic nanoparticles have been studied as catalysts for alternative energy applications. Metallic nanoparticles are an attractive alternative to bulk metal catalysts because the larger surface area to volume ratio reduces the overall mass of metal used. Furthermore, nano-sized or nano-structured catalysts have been shown to have enhanced catalytic activity when compared to their bulk counterparts, even when activity is normalized to available surface area. Modeling and experimental efforts suggest that reasons for such activity include: size-induced surface strain, an increase in crystal defects that serve as catalytic sites, unique structural compositions of multiple metals, and the occurrence of unique orbital interactions that allow an optimization of the activity of surface sites involved in catalytic and poisoning interactions.

A wide variety of nanoparticle synthesis techniques have been developed. Such techniques have allowed researchers to produce nanoparticles with specific sizes, shapes, and compositions, including multi-metallic nanoparticles with alloy or core-shell configurations.

The majority of successful catalysts for fuel cells contain at least one precious metal, and the most common catalyst material has been platinum. However, recent efforts have begun to focus on the reduction or elimination of precious metals in nano-catalysts due to costs of the precious metals. Nanoparticle synthesis methods that involve solution-based chemistry are of particular interest because of their ease of use, their versatility and manipulability, and their scalability. Accordingly, it would be beneficial to provide core-shell structured nanoparticles which could be utilized in a wide array of applications such as catalysts, and which are free of precious metals. It would also be beneficial to provide core-shell nanoparticle synthesis methods for producing such nanoparticles which involve solution-based chemistry.

SUMMARY

The difficulties and drawbacks associated with previously known nanoparticles, compositions containing such nanoparticles, and methods for producing such, are addressed herein.

In one aspect, the present subject matter provides core-shell nanoparticles comprising a core component that includes iron, and at least one shell component that includes nickel. The core-shell nanoparticles are free of precious metals.

In another aspect, the present subject matter provides a method of preparing core-shell nanoparticles having a core that includes iron and a shell that includes nickel. The method comprises producing iron core particles by reducing an iron salt using a reducing agent. The method also comprises forming a nickel shell about the iron core particles to thereby produce iron-nickel core-shell nanoparticles.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

The present subject matter provides core-shell nanoparticles. In certain embodiments, the core-shell nanoparticles include iron and nickel in particular configurations and/or regions within the particles. And in particular versions of the present subject matter, the core-shell nanoparticles are free of, or devoid of, precious metals. However, it will be understood that the present subject matter includes the incorporation of one or more precious metals within the nanoparticles. The term "precious metal" as used herein refers to platinum, rhodium, gold, iridium, osmium, palladium, rhenium, ruthenium, silver, germanium, beryllium, gallium, indium, and combinations thereof.

The present subject matter also provides aqueous-based solution chemistry synthesis techniques for producing core-shell iron-nickel nanoparticles. The synthesis techniques involve producing iron core particles by reducing an iron salt using one or more reducing agents, and then forming a nickel shell about the iron core particles to thereby produce iron-nickel core-shell nanoparticles.

Using the non-precious-metal nanoparticles of the present subject matter, oxidation of methane at ambient temperature and pressure is demonstrated herein. The nanoparticles were also evaluated for methanol and ethanol oxidation. Iron-only and nickel-only nanoparticles were synthesized as comparative controls, and the three types of nanoparticles were evaluated by solution electrochemistry and characterized for size, morphology, elemental composition, surface composition, and magnetism. These and other aspects of the present subject matter are described herein.

Nanoparticles

The term "core-shell particle" as used herein, refers to a particle having at least one shell or layer covering a core, in which the term "covering" means that the shell has a sufficient quality of material to form at least a monolayer of molecules over the underlying particle. Similarly, in the case of a particle comprising more than one shell, each shell is defined as covering the underlying core or shell, as the case may be, by a sufficient quantity of material to form at least a monolayer of molecules. The term "outer shell" is defined as the outermost shell that substantially covers the underlying particle. The term "outer shell" or "inner shell" are relative terms with respect to the center or nucleus of the particle. The core-shell particles can be spherical, non-spherical, tabular, plate-like, or irregular in shape.

Generally, in many embodiments of the present subject matter, core-shell nanoparticles are provided that comprise a core component that includes iron, and at least one shell component that includes nickel. Typically, the core-shell nanoparticles are free of precious metals. The core component may also include at least one element selected from the group consisting of nickel, oxygen, boron, and combinations thereof. In particular versions of the present subject matter, the core component includes nickel and iron in an atomic ratio in a range of from 0.7:1 to 1.2:1, respectively. Alternatively or in addition, in certain versions of the present subject matter, at least one shell also includes at least on element selected from the group consisting of iron, oxygen, and combinations thereof. The shell component may include nickel and iron in an atomic ratio in a range of from 0.4:1 to 1.2:1, respectively.

As previously noted, in certain embodiments of the present subject matter the nanoparticles are entirely free of precious metals. Thus, the nanoparticles do not include any precious metals in the core or any of the shells. However, the present subject matter includes nanoparticles which may optionally include one or more precious metals in either the core or one or more shells.

In still additional versions of the present subject matter, there is at least one shell component which includes a first shell and a second shell, the first shell being disposed between the core and the second shell. The first shell may include the nickel. The second shell may also include the nickel. The second shell may constitute the outer shell. The present subject matter also includes core-shell nanoparticles having more than two shells such as for example, three shells, four shells, or a greater number of shells.

The nanoparticles may be provided in a wide range of sizes. Generally, the nanoparticles have an average outer span within a range from 5 nm to 500 nm. In certain embodiments, the nanoparticles have an average outer span within a range of from 50 nm to 200 nm. The term "outer span" refers to the maximum span or distance of the particle as measured through the thickness of the particle. For spherical particles the outer span corresponds to a diameter of the particle.

Synthesis Methods

Methods for producing core-shell nanoparticles are provided. Generally, the methods provide synthesis techniques for producing core-shell nanoparticles that include a core containing iron and a shell containing nickel. The methods comprise producing iron core particles by reducing an iron salt using a reducing agent, and forming a nickel shell about the iron core particles to thereby produce iron-nickel core-shell nanoparticles. In particular versions of the present subject matter, the iron salt is iron sulfate heptahydrate ($FeSO_4*7H_2O$). However, the present subject matter includes the use of other iron salts.

Typically, one or more stabilizers are added during the noted operations. Specifically, the iron core particles can be produced by including a stabilizer agent during the reducing of the iron salt. The stabilizer may be a phosphonate stabilizer. The phosphonate stabilizer can be selected from the group consisting of amino tris(methylene phosphonic acid) (ATMP), diethylenetriamine penta(methylene phosphonic acid) (DTPMP), and combinations thereof. Generally, the phosphonate stabilizer is added to achieve a molar ratio to iron within a range of from 0.05:1 to 0.8:1, respectively. However, the present subject matter includes the use of other stabilizers and other types of phosphonate stabilizers.

The reducing agent used in forming the iron core is typically sodium borohydride ($NaBH_4$). If such agent is used, the sodium borohydride is added to achieve a molar ratio to iron of about 2.2-2.5 moles borohydride to 1 mole iron. It will be understood that the present subject matter includes the use of other reducing agents.

Additional aspects of the synthesis techniques include but are not limited to producing the iron core particles in an aqueous system. The nickel shell may be formed by producing an aqueous suspension of the iron core particles and adding a nickel salt to the suspension. The nickel salt may be nickel chloride hexahydrate ($NiCl*6H_2O$). However, the present subject matter includes the use of other nickel salts.

Typically, one or more stabilizers are added during the noted operation of forming the nickel shell. Thus, when forming the nickel shell, a stabilizer agent is included in the aqueous suspension. The stabilizer agent may be selected from the group consisting of polyvinyl pyrrolidone (PVP), carboxymethyl cellulose (CMC), amino tris (methylene phosphonic acid) (ATMP), diethylenetriamine penta(methylene phosphonic acid) (DTPMP), and combinations thereof. The stabilizer may be at least one of PVP and CMC and added to achieve a molar ratio to nickel within a range of from 0.0005 moles stabilizer: 1 mole of nickel to 0.05 moles stabilizer: 1 mole of nickel. The stabilizer may be at least one of ATMP and DTPMP and added to achieve a molar ratio to nickel within a range of from 0.05 moles stabilizer: 1 mole of nickel to 0.8 moles stabilizer: 1 mole of nickel. It will be appreciated that the present subject matter includes the use of other types of stabilizers in forming the nickel shell.

In certain embodiments, the nickel salt is added to achieve a molar ratio to iron within a range of from 0.5 millimoles nickel: 1 mole iron to 2,000 millimoles nickel: 1 mole iron.

In still other aspects of the present subject matter, the techniques include combining the iron-nickel core-shell nanoparticles with ethanol.

Generally, the iron-nickel core-shell nanoparticles produced using these various synthesis techniques are free of precious metals.

Specifically, core-shell nanoparticles containing iron and nickel are synthesized using an aqueous solution as follows. A specific concentration of iron (Fe) is added to purified water between a concentration of 1 g/L Fe and 10 g/L Fe as ferrous sulfate heptahydrate ($FeSo_4*7H_2O$). Stabilizer is added to the iron salt solution at a specific molar ratio of stabilizer to Fe. Typically a phosponate-type stabilizer is used for iron core synthesis and molar ratios of stabilizer to Fe are typically between 0.05 and 0.8, respectively. The stabilizers used for this operation are amino tris(methylene phosphonic acid) (ATMP) or diethylenetriamine penta(methylene phosphonic acid (DTPMP). The iron-stabilizer solution is mixed in a three-neck glass flask on an orbital shaker for approximately 15 minutes under argon. The argon is bubbled into the solution using a stainless steel needle. Argon bubbling removes dissolved oxygen in the solution.

After argon bubbling, the iron salt is reduced to iron metal, or zero-valent iron, nanoparticles (nZVI) through the addition of the reducing agent sodium borohydride ($NaBH_4$). $NaBH_4$ is added dropwise from an aqueous solution to achieve a specific molar ratio of $BH_4$ to Fe. Typically a ratio of 2.2:1-2.5:1 is used to form nZVI. The $NaBH_4$ solution is made fresh for each synthesis, and the $NaBH_4$ powder is mixed just prior to addition because the $BH_4$ also reacts with water. Due to this side reaction, the concentration of $BH_4$ slowly decreases over time. Based on the reaction between $BH_4$ and $Fe^{2+}$, a theoretical molar ratio of 2:1 $BH_4$:Fe is required to reduce all of the iron in solution. At least an additional 10% of $NaBH_4$ is added to account for the side reaction of borohydride and water to ensure that all of the $Fe^{2+}$ is reduced. After all of the $Fe^{2+}$ is reduced, the additional excess of $NaBH_4$ is used to keep the nZVI in a reducing environment between nZVI synthesis and nickel addition.

During borohydride addition, the flask is hand-mixed to keep the solution mixing as the reduction reaction starts. Once the sodium borohydride is completely added to the iron salt solution, the flask is returned to the orbital shaker, and shaken under vacuum for a specified amount of time, typically between 1 minute and 2 hours. After the borohydride is allowed to react with iron for the specified amount of time, nickel is added as nickel chloride hexahydrate in aqueous solution with a stabilizer. The molar ratio of nickel to iron ranges from 0.5 mmol Ni:mol Fe to 2000 mmol Ni:mol Fe. For higher ratios of nickel to iron (i.e., 500 mmol Ni:mol Fe to 2000 mmol Ni:mol Fe), an additional amount of sodium borohydride can be added after nickel addition to ensure all of the nickel is reduced. If no additional borohydride is added, at these higher molar ratios of nickel to iron, some, but not all, of the nickel will deposit onto the nZVI through electroless deposition. At lower ratios of nickel to iron, most, if not all, of the nickel added deposits onto the nZVI.

The stabilizer used for nickel addition is typically polyvinyl pyrrolidone (PVP), carboxymethyl cellulose (CMC), ATMP or DTPMP. The stabilizer is added to the nickel chloride solution at a molar ratio of 0.0005 to 0.05 stabilizer:Ni for either PVP or CMC and at a molar ratio of 0.05 to 0.8 stabilizer:Ni for either ATMP or DTPMP. CMC molecules are typically used at molecular weights of 90,000 g/mol or 250,000 g/mol, and PVP molecules are typically used at molecular weights of 10,000 g/mol to 40,000 g/mol. The stabilizer is dissolved into water to make a stock solution, and a certain volume of stabilizer stock solution is added to the nickel chloride solution and hand-mixed in a 50 mL centrifuge tube. The nickel-stabilizer solution is then added quickly to the nZVI suspension using a pipet. While the nickel-stabilizer solution is added, the glass flask is hand-mixed. Once the nickel-stabilizer solution is added, the flask is returned to the orbital shaker and mixed for a specified time, typically from about 15 minutes to 60 minutes.

Once the iron-nickel nanoparticles (Ni-nZVI) are synthesized, the nanoparticle suspension is removed from the glass flask, and the nanoparticles are separated from the synthesis solution by centrifuging at 18,000 relative centrifugal force (RCF) for about 30 minutes to 60 minutes. After centrifugation, the aqueous supernatant is pipetted out of the centrifuge tubes, and replaced by 100% ethanol. The centrifuge tubes are then sonicated on ice for about 60 minutes to resuspend the nanoparticles in the ethanol. 100% ethanol is used because ethanol is hygroscopic and not only assists in removing any additional water molecules that remain adsorbed to the nanoparticle surface but also keeps water away from the nanoparticles so that the nanoparticles remain stable and unreactive during storage. The nanoparticles are then tested for catalytic reactivity. The nanoparticles can also be stored dry by taking the ethanol suspension, centrifuging again for at least about 30 minutes, pipetting off the ethanol supernatant, and drying the remaining nanoparticle pellets under vacuum at room temperature. The dried nanoparticles are then stored in a drybox until needed.

The resulting morphology of the nanoparticles depends on the specific parameters chosen for the synthesis. Variations in stabilizer concentrations can be used to control the particle size. Typically, higher stabilizer concentrations result in smaller nanoparticles. A core-shell structure is obtained when the reaction time for borohydride addition to iron is longer, i.e., about 5 minutes to 120 minutes. This structure is understood to be iron core and nickel shell, and the elemental composition of the core and the shell can be affected by the amount of excess $NaBH_4$ added during nZVI synthesis and by the reaction time for borohydride addition. In particular, at longer reaction times or with less borohydride, the core-shell structure may have more oxygen in both the core and the shell. At shorter iron-borohydride reaction times, the particle morphology obtained is better described as an alloy structure, where there is not necessarily a definite nickel shell structure observed. The morphology is also affected by the molar ratio of nickel to iron used. At lower molar ratios of nickel to iron (e.g., 0.5 mmol Ni:mol Fe to 5 mmol Ni:mol Fe), only a thin or partial nickel shell is observed, whereas at higher molar ratios (e.g., 100 mmol Ni:mol Fe), a full shell of nickel is observed, and as the amount of nickel increases, the nickel shell becomes thicker. Based on catalysis investigations performed, the internal morphology of the nanoparticles (i.e., core-shell versus alloy) is important for catalytic reactivity and renders the nanoparticles particularly useful for specific types of reactions. For example, the core-shell morphology results in successful oxidation of compounds such as methanol, ethanol, and methane during electrochemical oxidation experiments, while the alloy morphology or an increase in oxygen content results in successful electrolysis of water. Furthermore, the core-shell particles appear to change in their morphology over time. The core-shell structure lasts for approximately 2-3 months, as does the catalytic reactivity towards oxidation of fuels. After several months, the particles are less reactive towards fuels but become more reactive for the electrolysis reaction. It is believed this change in catalytic reactivity is related to a change in particle morphology, and may be the result of a shift in particle morphology from the core-shell structure to more of an alloy structure as well as the incorporation of oxygen into the core-shell structure.

EXAMPLES

Materials

All chemicals used were American Chemical Society (ACS) grade and used as received. Iron sulfate heptahydrate, sodium borohydride, and nickel chloride hexahydrate were obtained from commercial suppliers and used in nanoparticle synthesis. The two nanoparticle stabilizers used were polyvinylpyrrolidone (PVP) and amino tris(methylene phosphonic acid) (ATMP). Purified water was used for all nanoparticle syntheses, and 200 proof ethanol was used to store nanoparticles between synthesis and electrochemical experiments.

Nanoparticle Synthesis

Core-shell iron-nickel nanoparticles were synthesized in a multi-step aqueous synthesis process. First, the core iron nanoparticles were synthesized. Briefly, iron sulfate heptahydrate and the stabilizer ATMP were combined in purified water in a three-neck flask. The stabilized iron was mixed for 15 minutes under argon. To reduce dissolved ferrous iron to iron metal nanoparticles, sodium borohydride was added dropwise to the solution, and the reaction was allowed to proceed under vacuum until hydrogen gas no longer evolved from the synthesis solution. For iron nanoparticle synthesis, ratios of 0.05 mol ATMP:mol Fe and 2.2 mol $BH_4$:mol Fe were used. The nickel shell was added to the iron core nanoparticles through electroless deposition. A PVP-stabilized nickel chloride hexahydrate solution was added to the iron nanoparticle suspension under rapid mixing, and the solution was allowed to react under vacuum for 15 minutes. Ratios of 0.005 mol PVP:mol Ni and 1.0 mol Ni:mol Fe were used for nickel deposition. After iron-nickel nanoparticle synthesis, the particles were centrifuged and resuspended in 200 proof ethanol for storage and characterization.

Iron-only and nickel-only nanoparticles were synthesized following the steps used for iron core nanoparticle synthesis. Both nanoparticle samples were produced through the borohydride reduction reaction and transferred to 200 proof ethanol for storage and characterization.

Nanoparticle Characterization

Iron-only, nickel-only, and iron-nickel core-shell nanoparticles were characterized for morphology, internal composition, surface composition, crystallinity, and magnetization. Scanning electron microscopy (SEM) and transmission electron microscopy (TEM) were used to determine particle shape, size, and internal morphology. Energy dispersive x-ray analysis (EDX) was performed during TEM imaging to determine the elemental composition of the different regions of the iron-nickel core-shell particles. TEM diffraction analysis and dark-field imaging were performed to evaluate the crystallinity and crystallite size of the iron-nickel core-shell nanoparticles. X-ray photoelectron spectroscopy (XPS) was used to evaluate the surface composition of all three types of nanoparticles. A superconducting quantum interference device (SQUID) magnetometer was used to evaluate the magnetic properties of the nanoparticles. SQUID measurements were performed on dry nanoparticle samples at 300 K between −7 T and 7 T.

Electrochemical Testing

The catalyst particles were mixed with a solution of a diblock alkaline exchange membrane ionomer (supplied by University of Massachusetts, Amherst, Mass.) in tetrahydrofuran (THF) and applied to a polished and cleaned glassy carbon electrode. The solvent was evaporated and the electrode cured in an oven.

The performance of the synthesized nanoparticles was evaluated with cyclic voltammetry (CV). Samples were prepared by combining a specific set of nanoparticles with Ketjen carbon and polymer on an electrode. Iron-only, nickel-only, iron-only+nickel-only, and iron-nickel core-shell nanoparticles were tested for each fuel. All syntheses were performed with silver-silver chloride (Ag/AgCl) as the reference electrode. CV experiments were performed at room temperature and ambient pressure in the presence of a 1 M sodium hydroxide electrolyte solution. Three potential alternative fuels, methanol, ethanol, and methane, were tested. For each fuel test, a baseline was first obtained in the absence of the fuel. Methanol and ethanol were both tested at a concentration of 1 M, and methane was tested at a flow rate of 15 mL/min. The CV scan rate was 25 mV/s for all investigations. Tafel plots were constructed from linear sweep voltammetry experiments, in which the scan rate was 1 mV/s.

RESULTS AND DISCUSSION

Nanoparticle Synthesis

Nanoparticles were synthesized to have an iron core and a nickel shell. The synthesis procedure illustrated in FIG. 1 was developed based on the concept of sequential addition and reduction of metal salts, in which the first metal, iron, is reduced with a reducing agent (sodium borohydride), and the second metal, nickel, is deposited on the surface of the iron. Since nickel has a more positive standard reduction potential than iron ($E°=-0.44$ mV for bivalent iron and $E°=-0.25$ mV for bivalent nickel), nickel cations are reduced as iron metal atoms are oxidized in two-electron transfer reactions. Therefore, no additional reducing agent is necessary to form iron-nickel core-shell particles.

Figure 1:
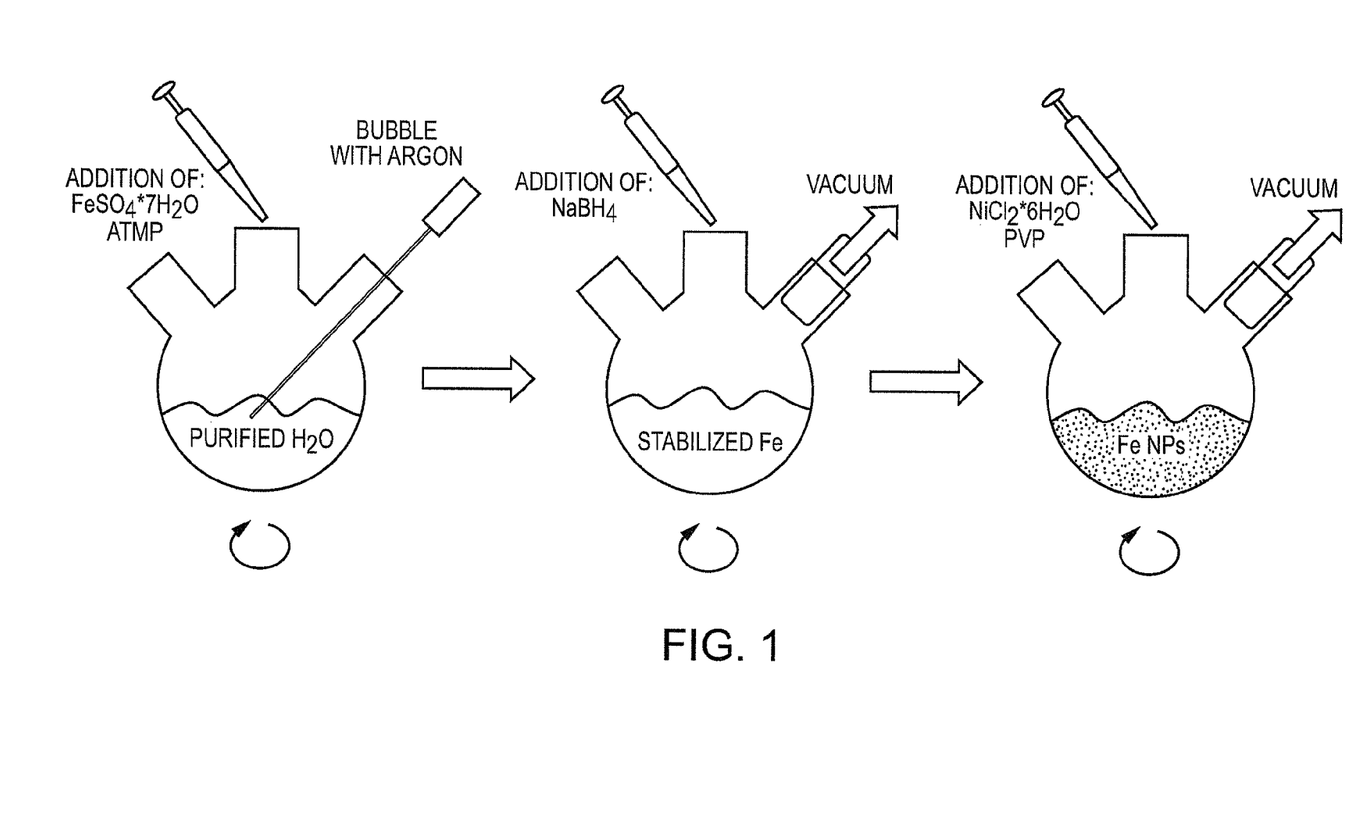
FIG. 1 is a schematic illustration of a method of producing iron-nickel core-shell nanoparticles in accordance with the present subject matter.
Figure 2A:
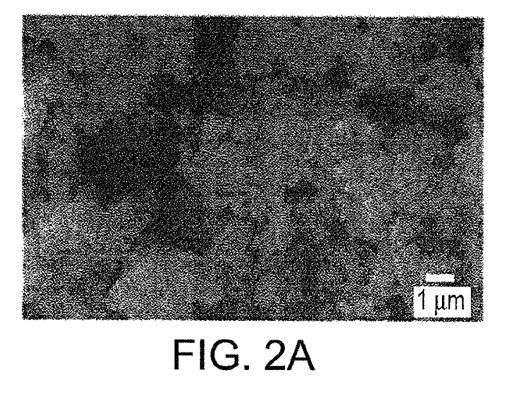
FIGS. 2A-2D include scanning electron microscopy (SEM) images of iron-nickel core-shell nanoparticles in accordance with the present subject matter.
Figure 2B:
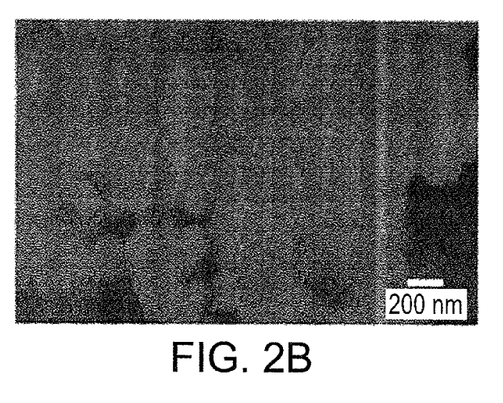
Figure 2C:
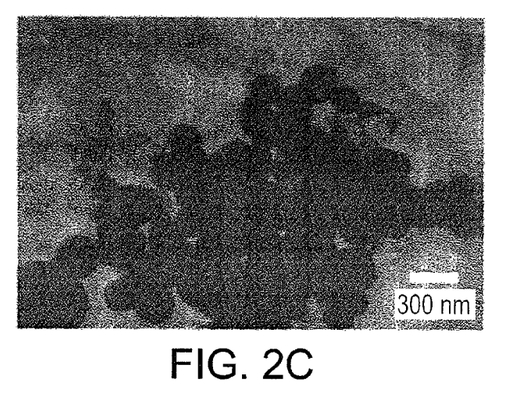
Figure 2D:
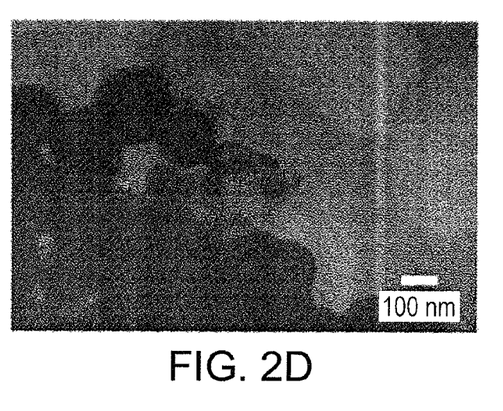

Single-metal nanoparticles produced were formed after the first two steps shown in FIG. 1 in which argon bubbling in the first step is used to reduce oxygen exposure during nanoparticle synthesis. However, since the syntheses were not performed in an atmosphere-controlled glove box and were processed post-synthesis in air, it is believed that exposure to oxygen caused the formation of a native oxide shell on both the iron-only nanoparticles and the nickel-only nanoparticles. For iron, models predict that the initial 1 nm of oxide forms in approximately 0.2 fs, with oxide growth continuing based on particle size. Nickel generally has slower oxidation kinetics than iron at room temperature, but similar to iron nanoparticles, nickel nanoparticles have been shown to form a native oxide shell that is passivating.

Nanoparticle Characterization

SEM images shown in FIGS. 2A-2D of the iron-nickel core-shell nanoparticles suggest the synthesized sample had a wide particle size distribution, with multiple size groups observed. Larger particles of approximately 200 nm in diameter are clearly seen with SEM, whereas smaller particles appear to have an unfocused, fuzzy appearance due to the resolution limit of SEM.

Figure 3A:
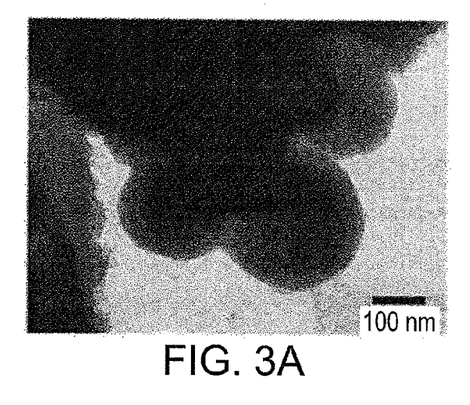
FIGS. 3A-3D include transmission electron microscopy (TEM) images of various iron-nickel core-shell internal morphologies in accordance with the present subject matter.
Figure 3B:
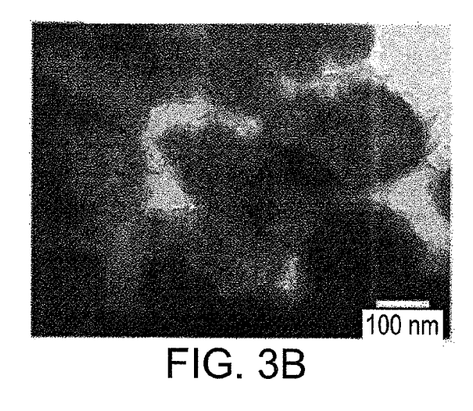

Images from TEM shown in FIGS. 3A-3D also show a range of particle sizes from approximately 50 nm to 300 nm. From the TEM images obtained, it appears that several nanoparticle morphologies are formed during iron-nickel core-shell nanoparticle synthesis. FIG. 3 includes TEM images of iron-nickel core-shell internal morphologies including (a) nanoparticles with high contrasts and no shell, and (b) nanoparticles with a low contrast core, high contrast shell, and a second, low-contrast shell. Dark-field imaging (c) of iron-nickel nanoparticles and (d) absence of diffraction patterns suggest nano-crystallinity. Specifically, three distinct internal morphologies were observed: nanoparticles with a high contrast and an outer, lower-contrast shell as shown in FIG. 3A, nanoparticles with a low contrast and no visible outer shell as shown in FIG. 3B (top of image), and nanoparticles with a low-contrast center, a high-contrast shell, and a second, low-contrast shell as shown in FIG. 3B (middle right in image). In addition, some particles that consisted of a low-contrast center and a high-contrast shell also had a high-contrast region at the very center of the particle; in other words, these particles had a high-contrast center and three shells of alternating contrast and varying thickness. An example of this morphology is shown in FIG. 4.

Figure 3C:
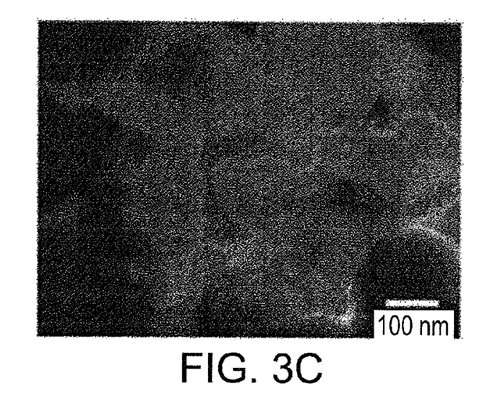
Figure 3D:
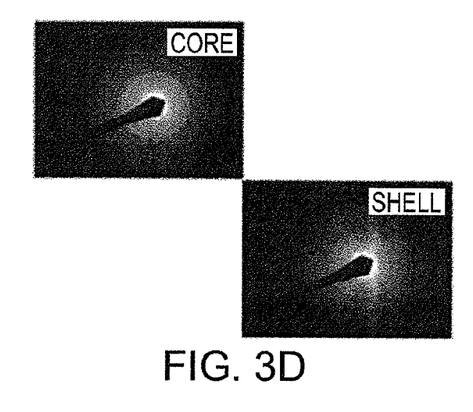

When dark-field imaging is used on the iron-nickel core-shell nanoparticles as shown in FIG. 3C, small, bright spots are observed, and when diffraction analysis is performed in the TEM as shown in FIG. 3D, no diffraction patterns are obtained. The bright spots are a visual indication that there are crystalline regions in the nanoparticles, and the absence of diffraction patterns may suggest not only amorphous character but crystallites that are too small to be detected by TEM diffraction analysis. Taken together, these two results suggest that the nanoparticles may be composed of many small nanocrystalline regions.

Figure 4:
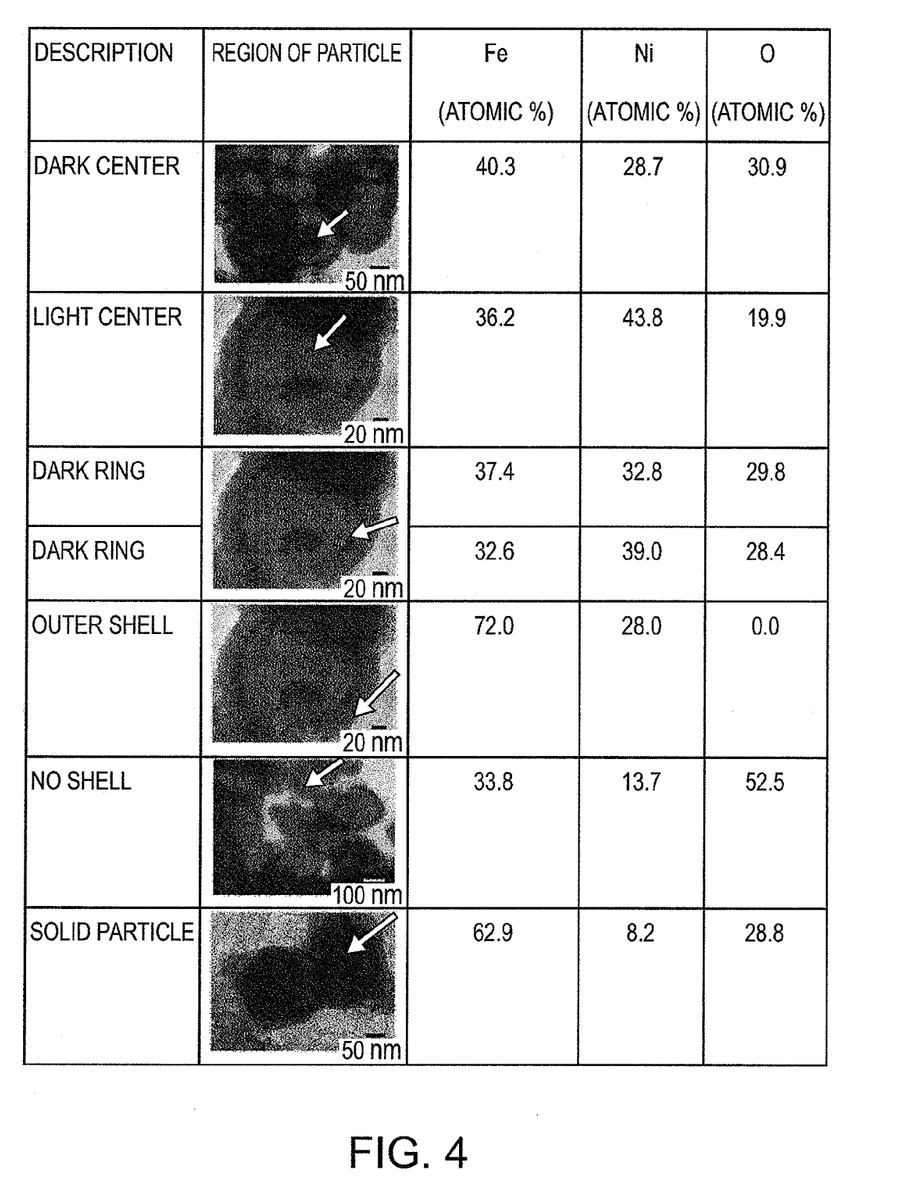
FIG. 4 is a table listing TEM and elemental analysis (EDX) of specific regions of synthesized iron-nickel nanoparticles in accordance with the present subject matter.

In addition to imaging and diffraction analysis, elemental analysis was performed on TEM samples using EDX (FIG. 4). On the TEM used for EDX analysis, the spot size can be reduced to approximately 35 nm and therefore can be used to obtain a preliminary picture of the elemental composition of the different morphological regions observed. EDX data suggest the different morphologies observed in TEM may have different compositions of nickel, iron, and oxygen, with the contrast-alternating multi-shell particles containing the highest ratio of nickel to iron. Furthermore, the individual shells observed in this particular particle morphology appear to have different compositions of iron, nickel, and oxygen. The low-contrast (i.e., light) center resulted in an atomic Ni:Fe ratio of 1.2, while the high-contrast (i.e., dark) center resulted in an atomic Ni:Fe ratio of 0.7. The dark ring or shell of these particles resulted in a range of atomic Ni:Fe ratios from 0.9-1.2. Finally the outer, low-contrast shell of these particles resulted in an atomic ratio of 0.4 Ni:Fe. Interestingly, the outer shell of these particles was the only area that resulted in an undetectable oxygen signal. There may be some oxygen present that was below the detection limit of EDX, but the data suggest that this outer shell may contain little to no oxygen. The other regions of this particle morphology all contained 20 atomic % to 30 atomic % oxygen. The presence of organic stabilizer likely contributes to at least a portion of this oxygen content for each of the nanoparticle regions analyzed.

Particles with low contrast and no observed outer shell had a Ni:Fe atomic ratio of 0.4, while particles with high contrast and an outer shell had the lowest measured Ni:Fe atomic ratio (0.1). Even though the nanoparticles were synthesized at a molar (i.e., atomic) ratio of 1.0 Ni:Fe, EDX data suggest that the nickel salt was in excess as not all of the particles contained an atomic ratio of 1.0 Ni:Fe. These results are consistent with the visual observation that after the nanoparticles were centrifuged, the supernatant had a green-blue color. This remaining color and the EDX data are indications that dissolved nickel remained in solution after synthesis. It is possible that the remaining nickel may have eventually deposited onto the surface of the nanoparticles if the solution was allowed to react for a longer period of time, or the remaining nickel could potentially be deposited through the addition of a reducing agent.

Taken together, the TEM images and TEM EDX results suggest that this nanoparticle synthesis method produces particles that not only have several different physical morphologies but may have different elemental compositions in different regions of the particle. In addition, it appears that nickel may be in both the shell of the nanoparticles, as well as part of the internal regions of the nanoparticles. The presence of oxygen in the EDX data suggests the formation of oxides or hydroxides that are incorporated into the nanoparticle structure during or after the synthesis process. The lack of oxygen in the outer-most shell of the nanoparticles may indicate that the oxygen that is present is incorporated primarily during particle synthesis. The incorporation of oxygen may occur as the formation of a native oxide shell on the iron core particles before nickel deposition. Subsequent nickel deposition appears to create, in some cases, particles with multiple shells and shells with little to no oxygen.

XRD analysis of the iron-only, nickel-only, and iron-nickel core-shell nanoparticles (FIG. 5) indicates that the primary peak for iron-only nanoparticles is the body-centered cubic (110) surface and the primary peak for nickel-only nanoparticles is the face-centered cubic (111) surface. Both spectra also have a broad peak around 80°, which may be from the (211) surface for iron and the (221) surface for nickel. The iron-nickel nanoparticle spectrum is dominated by a peak at 45°, with the shape and location of the curve more similar to that of the iron-only nanoparticle spectrum than to that of the nickel-only nanoparticle spectrum. The XRD spectra suggest that little to no crystalline oxide is formed on or within the nanoparticles for all three samples.

Figure 5:
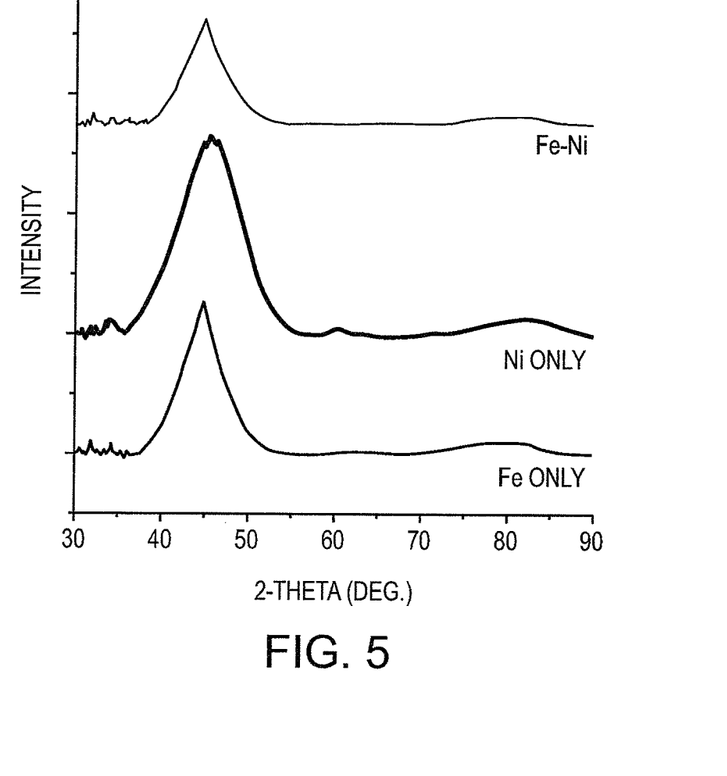
FIG. 5 is a graph illustrating x-ray diffraction (XRD) analysis of iron-only nanoparticles, nickel-only nanoparticles, and iron-nickel core-shell nanoparticles in accordance with the present subject matter.

All three XRD spectra display significant peak broadening, as compared to a typical XRD spectrum obtained for a bulk crystalline metal. Peak broadening can be caused by the presence of small nanoparticles. According to the Scherrer formula, a particle size of approximately 10 nm causes 1° of peak broadening for the full width of the peak at half maximum (FWHM). Peak broadening can also be caused by the presence of amorphous regions. However, both of these causes are peak broadening are unlikely candidates in this case because TEM imaging showed particles much larger than 10 nm and small, bright regions indicative of nanocrystallinity in dark-field mode. Another cause for significant peak broadening is the presence of defects in nano-structured crystalline materials, including vacancies, stacking faults and twin faults. The presence of vacancies typically causes a decrease in the signal intensity as a result of increased background intensity. Stacking faults cause peak broadening and shifts in peak locations, while twin faults cause asymmetrical peak broadening.

When the spectrum for the iron-only nanoparticles is compared to an unstabilized iron-only nanoparticle sample, lower signal intensity, peak broadening, peak shift, and asymmetrical broadening behaviors are all observed. Since the iron-nickel core-shell nanoparticle spectrum most closely resembles the ATMP-stabilized iron-only nanoparticle spectrum, this evidence strongly suggests that these nanoparticles are composed of nano-crystalline regions with a high occurrence of multiple types of defects, including vacancies, stacking faults, and twin faults.

Figure 6:
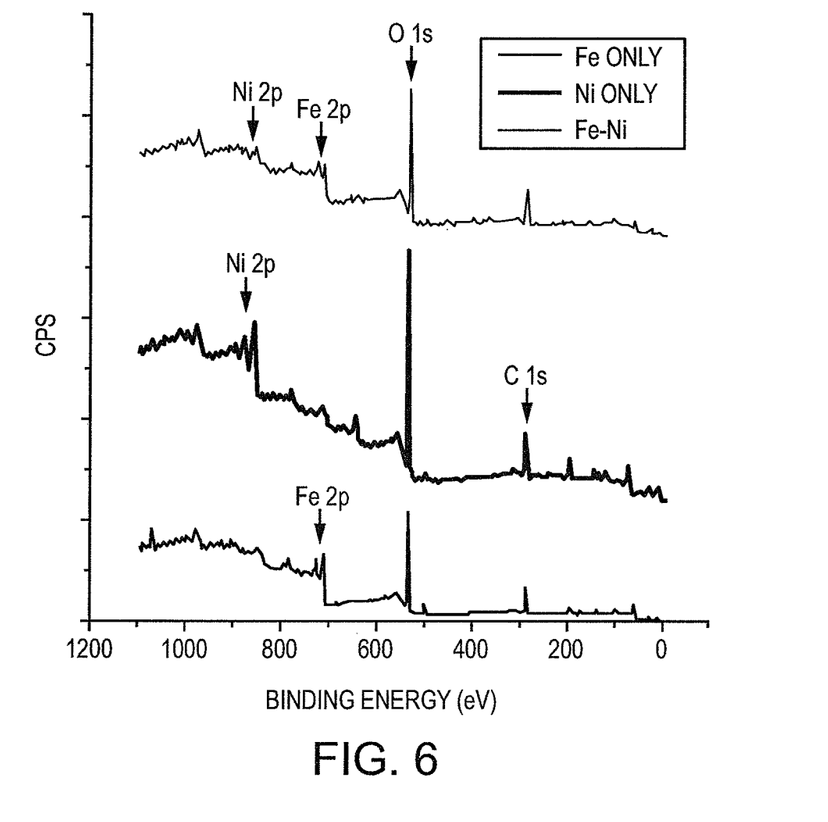
FIG. 6 is a graph illustrating x-ray photoelectron spectroscopy (XPS) of iron-only nanoparticles, nickel-only nanoparticles, and iron-nickel core-shell nanoparticles in accordance with the present subject matter.

XPS analysis was used to evaluate the surface composition of the three nanoparticle samples (FIG. 6). Peaks for Fe 2p and Ni 2p were identified, as well as peaks for O 1s and C 1s. The oxygen and carbon peaks are typically always obtained for any XPS sample prepared outside of a high vacuum chamber because organic compounds quickly deposit and form a layer on the surface of the sample. In the noted samples, the organic stabilizers used during nanoparticle synthesis also likely contributed to these peaks.

Figure 7A:
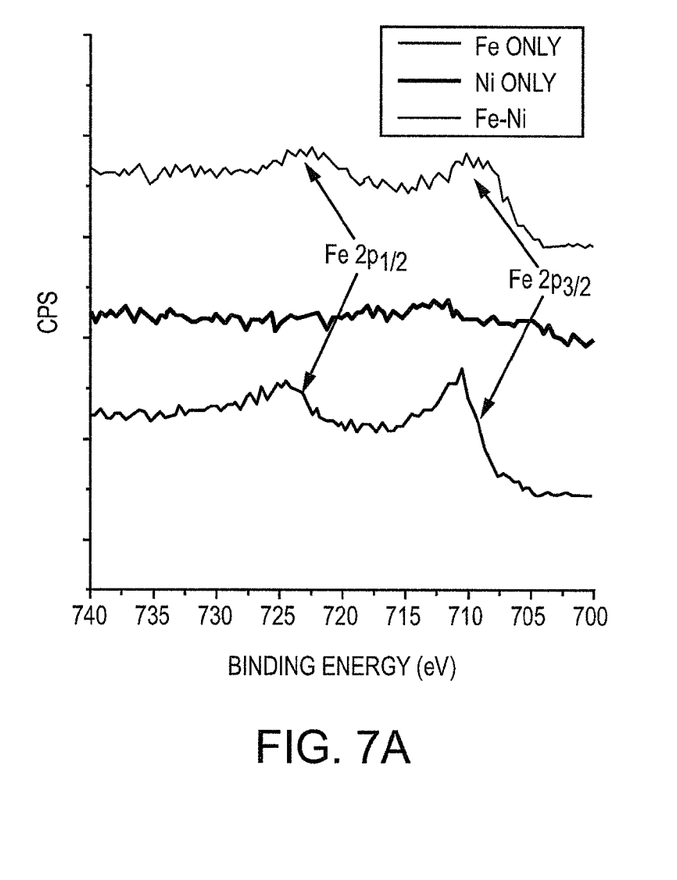
FIGS. 7A and 7B are graphs of high resolution XPS spectra of the binding energy regions for Fe2p (FIG. 7A) and Ni2p (FIG. 7B) with peaks labeled based on reported values in the literature.
Figure 7B:
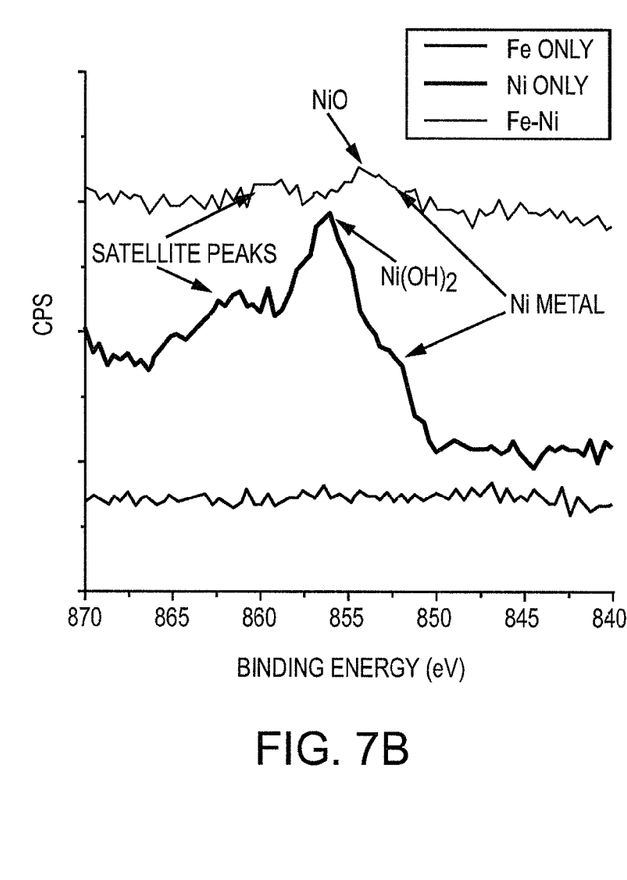

An analysis of the Fe 2p and Ni 2p regions at higher resolution (FIGS. 7A and 7B) can be used to determine the oxidation state of the two elements at the nanoparticle surface. For both Fe 2p and Ni 2p, multiple peaks are obtained within the binding energy ranges of 700 eV to 740 eV and 840 eV to 870 eV, respectively. Typically, the binding energy of the element increases as the degree of oxidation increases, causing a shift in the peak locations in the XPS spectra. In addition, the peak intensity and the relative contribution of each peak can also be correlated to the oxidation state of the metal.

For iron (FIG. 7A), the peaks associated with Fe $2p_{1/2}$ and Fe $2p_{3/2}$ are visible for the iron-only and iron-nickel core-shell nanoparticle samples. The nickel-only nanoparticle sample spectrum does not contain peaks in this region, as expected. The Fe 2p peaks for the iron-nickel nanoparticles are shifted to lower binding energies, as compared to the iron-only nanoparticle sample. It has been reported in the literature that the $2p_{3/2}$ peak location for iron metal ($Fe^0$) ranges from 706 eV to 707 eV, while iron oxides and iron hydroxides have a $2p_{3/2}$ peak between 709 eV and 711 eV. Based on these ranges, the results presented herein suggest that the iron on the surface of the iron-only nanoparticles is primarily in the form of iron oxide, while the iron on the surface of iron-nickel nanoparticles appears to be combination of iron oxide and iron metal.

For nickel (FIG. 7B), peaks are observed in the 2p region for the nickel-only and iron-nickel core-shell nanoparticles, and no peaks are observed in this region for the iron-only nanoparticle sample. The location and number of peaks differs between the nickel-only and the iron-nickel spectra. The nickel-only nanoparticle sample resulted in peaks for nickel hydroxide and nickel metal, while the iron-nickel nanoparticle sample contained peaks for nickel oxide and nickel metal. The peak for nickel metal in the iron-nickel nanoparticle spectrum is small, and further analysis of this binding energy region would be necessary to confirm the presence of this peak. However, the presence and location of the small satellite peak also suggest the presence of nickel metal in this spectrum. The satellite peak for nickel metal is located approximately at 859 eV, while the satellite peaks for nickel oxide or nickel hydroxide are typically located at binding energies greater than 860 eV.

The XPS results for Fe 2p and Ni 2p peak locations in the nanoparticle samples described herein suggest that the outer shell of the iron-nickel nanoparticles contains more iron and nickel atoms with an oxidation state of zero, compared to both the iron-only and nickel only nanoparticle samples. XPS results suggest that the iron-nickel nanoparticles also contain oxides in the outer shell. The XPS data support data obtained by TEM EDX. The detection of oxides in the outer shell by XPS likely results from the greater sensitivity of the technique compared to EDX and the mixture of particle morphologies present in the sample, where some particles likely have more oxide in the outer shell than others.

Data obtained from a SQUID magnetometer indicated that at room temperature, the saturation magnetization for iron-nickel core-shell nanoparticles ranged from 25 $A \cdot m^2/kg$ to 40 $A \cdot m^2/kg$, with a small residual magnetization after the particles had been in the presence of an applied field. The saturation magnetization of iron metal is known to be 218 $A \cdot m^2/kg$, and the saturation magnetization of nickel metal is known to be 54 $A \cdot m^2/kg$. Compared to these values for the bulk crystalline metals, the values obtained for the iron-nickel core-shell nanoparticles are significantly lower and more variable from sample to sample than one might expect. When specific magnetization ($A \cdot m^2/kg$) was plotted as a function of applied magnetic field (T), the sharp increase in specific magnetization indicated that the particles are ferromagnetic. The asymptotic behavior of the specific magnetization at large applied fields (>1 T) precluded a contribution of paramagnetism to the overall magnetic behavior. Minimal hysteresis in the magnetization curves after forward and reverse field sweeps suggests that the particles have multiple crystal domains.

The iron-only nanoparticles had a saturation magnetization of 100 $A \cdot m^2/kg$, and the nickel-only nanoparticles resulted in a linear relationship between specific magnetization ($A \cdot m^2/kg$) and applied magnetic field (T), which indicates that the particles were paramagnetic, not ferromagnetic. The decrease in saturation magnetization for all three particle samples, as compared to their bulk metal counterparts suggests the presence of metal oxides, a result that is consistent with TEM EDX and XPS results.

Electrochemistry

Figure 8A:
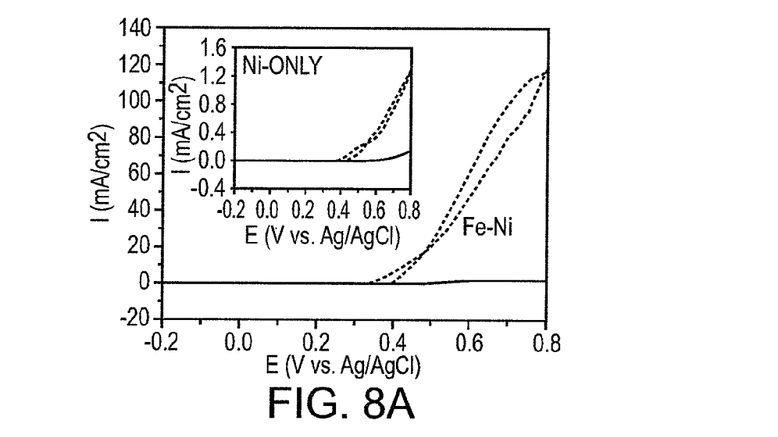
FIGS. 8A, 8B, and 8C are graphs illustrating electrochemical analysis of nickel-only nanoparticles and iron-nickel core-shell nanoparticles in accordance with the present subject matter for 1M methanol (FIG. 8A), 1M ethanol (FIG. 8B), and 15 mL/min methane (FIG. 8C).
Figure 8B:
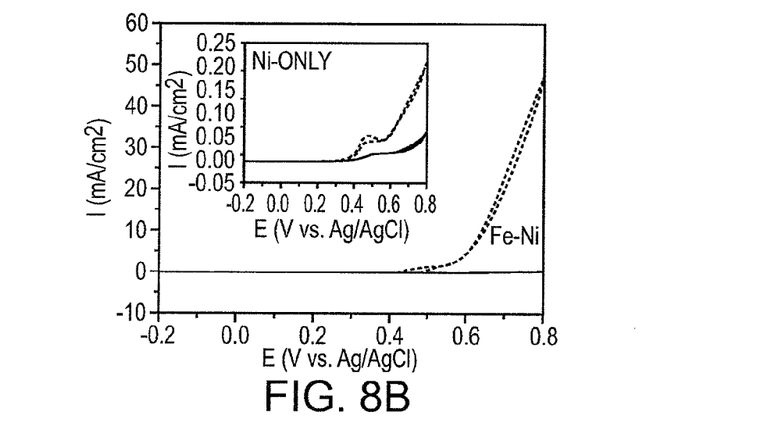
Figure 8C:
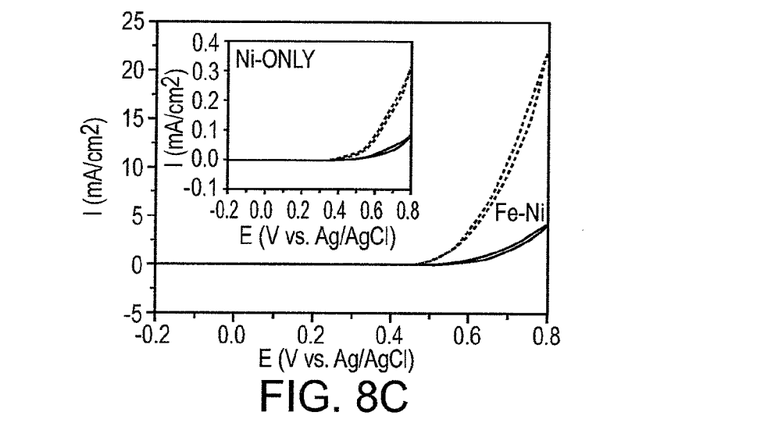

CV was initially used to evaluate the oxidation potential of the synthesized nanoparticles for three fuels: methanol, ethanol, and methane (FIGS. 8A-8C). FIGS. 8A-8C illustrate electrochemical analysis of nickel-only and iron-nickel core-shell nanoparticles for 1 methanol (FIG. 8A), 1 methanol 8B (FIG. 8B), and 15 mL/min methane (FIG. 8C). All electrochemical data were obtained at room temperature and ambient pressure in the presence of 1 M sodium hydroxide electrolyte. In all cases, except for methane, good baseline data was obtained after repeated cycling the catalyst in the electrolyte. The effect of cycling on the catalyst particles is unknown but could result in cleaning of the catalyst surface or even dealloying the Fe from the Ni rich shell. Attempts to obtain clean baseline data with a Fe only nano-particle failed. This result is not surprising when one considers the Pourbaix diagram for Fe. Fe is expected to be oxidized to water soluble Fe oxide species at high pH and high potential, and so CV investigations on Fe only nano-particles presumably record the corrosion currents as the Fe is dissolved. Ni is expected to have some activity for the oxidation of hydrocarbons, although under the conditions of the investigation the Pourbaix diagram predicts that the surface of the Ni only nanoparticles will be oxidized. Moderate current densities, in the micro-amp/$cm^2$ range, are observed for Ni with all three fuels and all at the same onset potential of 0.4 V.

Dramatically larger current densities are observed when fuels are oxidized using the Fe—Ni nanoparticles. The onset potentials of the electro-catalysis seem to shift more positive with the increasing difficulty in oxidizing the fuel from methanol, to ethanol, to methane. The current densities obtained also decline in this order, with 120 mA/$cm^2$ being observed for MeOH oxidation at 0.7V vs Ag/AgCl. This current density is about one-quarter that observed for Pt, which is very encouraging when one considers the expense and lack of abundance of Pt. The oxidation current for ethanol is approximately one-half that of methanol. Remarkably, a significant, but smaller, oxidation current for methane was observed.

It is believed that this is the first demonstration of room temperature oxidation of methane by a metal catalyst free of precious metals.

Figure 9:
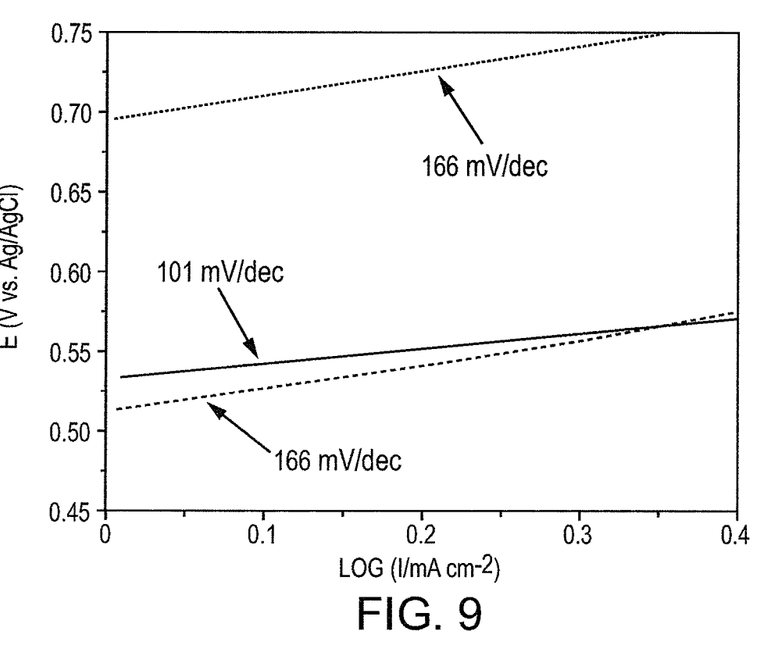
FIG. 9 is a Tafel plot comparison for three nanoparticle compositions in accordance with the present subject matter evaluated herein.

The Tafel slopes obtained are, not surprisingly, fairly high (FIG. 9). Interestingly the Tafel slope for methanol, 101 mV/dec is lower than that for both methane and ethanol, which may imply selective oxidation of the methyl group in the later two molecules.

Successful electrochemical oxidation of three fuels, methanol, ethanol, and methane, has been demonstrated at ambient temperature and pressure by a nanoparticle catalyst composed completely of non-precious metals. This core-shell nanoparticle catalyst was synthesized to contain iron as the core material and nickel as the shell. TEM analysis indicates that the nanoparticle synthesis method produces iron-nickel core-shell nanoparticles of several internal morphologies. The different morphological regions of the iron-nickel nanoparticles appear to have varying elemental compositions of iron, nickel, and oxygen. TEM diffraction analysis and XRD analysis suggest that the iron-nickel nanoparticles are composed of nanocrystalline domains that likely contain vacancies and faults in the crystal structure. The XRD data do not indicate the presence of crystalline oxides, but TEM EDX and XPS analysis suggest that both the internal and surface structures of the iron-nickel nanoparticles contain oxygen.

The iron-nickel nanoparticles were compared to iron-only and nickel-only nanoparticles for both characterization and electrochemistry purposes. The iron-only nanoparticles resulted in failed electrochemistry results, and the nickel-only nanoparticles resulted in current densities that were two orders of magnitude lower than those obtained with the iron-nickel nanoparticles.

Many other benefits will no doubt become apparent from future application and development of this technology.

All patents, published applications, standards, publications, and articles noted herein are hereby incorporated by reference in their entirety.

As described hereinabove, the present subject matter solves many problems associated with previous particles, compositions, strategies, systems and/or devices. However, it will be appreciated that various changes in the details, materials and arrangements of materials, components and/or operations, which have been herein described and illustrated in order to explain the nature of the present subject matter, may be made by those skilled in the art without departing from the principle and scope of the claimed subject matter, as expressed in the appended claims.

What is claimed is:

1. Core-shell nanoparticles comprising:
a core component that includes iron; and
at least one shell component that includes nickel;
wherein the core-shell nanoparticles are free of precious metals and the at least one shell also includes at least one element selected from the group consisting of iron, oxygen, and combinations thereof.

2. The core-shell nanoparticles of claim 1 wherein the core component also includes at least one element selected from the group consisting of nickel, oxygen, boron, and combinations thereof.

3. The core-shell nanoparticles of claim 2 wherein the core component includes nickel and iron in an atomic ratio in a range of from 0.7:1 to 1.2:1, respectively.

4. The core-shell nanoparticles of claim 1 wherein the shell component includes nickel and iron in an atomic ratio in a range of from 0.4:1 to 1.2:1, respectively.

5. The core-shell nanoparticles of claim 1 wherein the at least one shell component includes a first shell and a second shell, the first shell disposed between the core and the second shell.

6. The core-shell nanoparticles of claim 5 wherein the first shell includes the nickel.

7. The core-shell nanoparticles of claim 5 wherein the second shell includes the nickel.

8. The core-shell nanoparticles of claim 1 wherein the nanoparticles have an average outer span within a range of from 5 nm to 500 nm.

9. The core-shell nanoparticles of claim 8 wherein the nanoparticles have an average outer span within a range of from 50 nm to 200 nm.

10. A method of preparing core-shell nanoparticles having a core that includes iron and a shell that includes nickel, the method comprising:

producing iron core particles by reducing an iron salt using a reducing agent;
forming a nickel shell about the iron core particles to thereby produce iron-nickel core-shell nanoparticles, wherein forming the nickel shell is performed by forming an aqueous suspension of the iron core particles and adding a nickel salt to the suspension and wherein forming the nickel shell is performed by including a stabilizer agent in the aqueous suspension.

11. The method of claim 10 wherein the iron salt is iron sulfate heptahydrate ($FeSO_4 \cdot 7H_2O$).

12. The method of claim 10 wherein producing the iron core particles is performed by including a stabilizer agent during the reducing of the iron salt.

13. The method of claim 12 wherein the stabilizer is a phosphonate stabilizer.

14. The method of claim 13 wherein the phosphonate stabilizer is selected from the group consisting of amino tris (methylene phosphonic acid) (ATMP), diethylenetriamine penta(methylene phosphonic acid) (DTPMP), and combinations thereof.

15. The method of claim 13 wherein the phosphonate stabilizer is added to achieve a molar ratio to iron within a range of from 0.05:1 to 0.8:1, respectively.

16. The method of claim 10 wherein the reducing agent is sodium borohydride ($NaBH_4$).

17. The method of claim 16 wherein sodium borohydride is added to achieve a molar ratio to iron of from 2.2 to 2.5 moles borohydride to 1 mole iron.

18. The method of claim 10 wherein producing the iron core particles is performed in an aqueous system.

19. The method of claim 10 wherein the nickel salt is nickel chloride hexahydrate ($NiCl \cdot 6H_2O$).

20. The method of claim 10 wherein the stabilizer agent is selected from the group consisting of polyvinyl pyrrolidone (PVP), carboxymethyl cellulose (CMC), amino tris (methylene phosphonic acid) (ATMP), diethylenetriamine penta(methylene phosphonic acid) (DTPMP), and combinations thereof.

21. The method of claim 20 wherein the stabilizer agent is at least one of PVP and CMC and added to achieve a molar ratio to nickel within a range of from 0.0005 moles stabilizer: 1 mole of nickel to 0.05 moles stabilizer: 1 mole of nickel.

22. The method of claim 20 wherein the stabilizer agent is at least one of ATMP and DTPMP and added to achieve a molar ratio to nickel within a range of from 0.05 moles stabilizer: 1 mole of nickel to 0.8 moles stabilizer: 1 mole of nickel.

23. The method of claim 10 wherein the nickel salt is added to achieve a molar ratio to iron within a range of from 0.5 millimoles nickel: 1 mole iron to 2,000 millimoles nickel: 1 mole iron.

24. The method of claim 10 further comprising:
combining the iron-nickel core-shell nanoparticles with ethanol.

25. The method of claim 10 wherein the iron-nickel core-shell nanoparticles are free of precious metals.

* * * * *